United States Patent [19]

Langeraar

[11] 4,347,592
[45] Aug. 31, 1982

[54] SONAR

[75] Inventor: Huibert B. Langeraar, Hengelo, Netherlands

[73] Assignee: Hollandse Signaalapparaten B.V., Hengelo, Netherlands

[21] Appl. No.: 206,193

[22] PCT Filed: Aug. 2, 1979

[86] PCT No.: PCT/NL79/00003
§ 371 Date: Apr. 22, 1980
§ 102(e) Date: Apr. 14, 1980

[87] PCT Pub. No.: WO80/00497
PCT Pub. Date: Mar. 20, 1980

[30] Foreign Application Priority Data
Aug. 22, 1978 [NL] Netherlands ............... 7808635

[51] Int. Cl.³ .................. G01S 7/52; G01K 11/00
[52] U.S. Cl. .................................. 367/137; 367/138
[58] Field of Search .............. 367/137, 138; 331/117

[56] References Cited
U.S. PATENT DOCUMENTS
3,243,728 3/1966 Brainerd et al. .................. 331/117
3,806,862 4/1974 Chao ................................. 367/137

Primary Examiner—Richard A. Farley
Attorney, Agent, or Firm—Robert J. Kraus

[57] ABSTRACT

An arrangement for generating amplitude-modulated, ultrasonic transmission pulses comprising at least a switching circuit (4) provided with an inductive load (12) for generating the transmission pulses and controlled with a plurality of switching pulses per pulse interval; a memory (2) filled with information about the appropriate pulse width of the switching pulses as required per transmission pulse interval; and a switching-pulse generator (3) for producing switching pulses using the pulse width information and timing signals determining the switching pulse frequency. This arrangement is suitable for sonar applications for the purpose of improving the detection of doppler shifted echo signals.

11 Claims, 12 Drawing Figures 4,347,592

SONAR

BACKGROUND OF THE INVENTION

The invention relates to an arrangement for generating amplitude-modulated, ultrasonic transmission pulses. An arrangement of this type is used preferably for generating transmission pulses with a small frequency spectrum and, in particular, with a low side-lobe level in order to achieve better detection of doppler-shifted echo signals.

Such an arrangement is known in an embodiment comprising a linear amplifier, connected to a high-power, fixed-frequency oscillator and driven with a control voltage of a suitably selected amplitude behaviour to obtain amplitude modulation of the oscillator output voltage. This arrangement has the disadvantage that it becomes complicated and costly if it is required to generate high power, ultrasonic transmission pulses in accordance with a predetermined amplitude behaviour with sufficient accuracy.

SUMMARY OF THE INVENTION

It is an object of the present invention, therefore, to provide an arrangement as set forth in the opening paragraph, whereby the above disadvantage is substantially obviated.

According to the invention, the arrangement for generating amplitude-modulated, ultrasonic transmission pulses comprises a combination of:

a. a switching circuit controlled with a plurality of switching pulses per pulse interval, which switching circuit includes an inductive load circuit for generating the transmission pulses;

b. a unit for generating timing signals determining the switching pulse frequency;

c. a memory, of which the memory locations are filled with the information, required per transmission pulse interval, about the pulse width of the switching pulses to be generated, which information is derived from the desired amplitude pattern of the transmission pulses to be generated;

d. a switching-pulse generator for producing the switching pulses, using the timing signals on the one hand and the pulse width information in the memory on the other hand;

e. an address generator for generating addresses on the supply of the timing signals to read out the memory.

BRIEF DESCRIPTION OF THE DRAWING

The invention will now be described with reference to the accompanying five figures of which:

FIG. 1A is a timing diagram of a limited number of pulsed signals of varying width to obtain an amplitude-modulated ultrasonic transmission pulse, while

DESCRIPTION OF THE PREFERRED EMBODIMENT

Figure 1A:
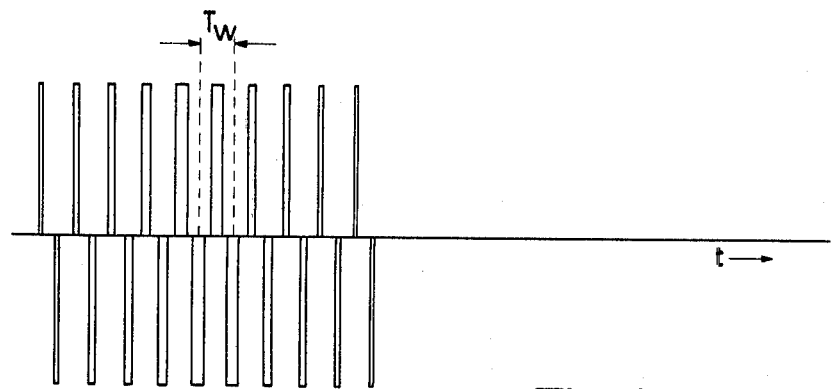

The timing diagram of FIG. 1A shows a sequence of pulsed signals generated at a given frequency $f_p$, while each pair of pulses has the same pulse width with an alternating polarity. Apart from such a pulse width behaviour, the pulse width increases in time to a given value and subsequently decreases. When a sequence of signals of this sort is applied to an inductive load circuit of suitable dimensions, it will produce as signal component the first harmonic of this sequence, the characteristics of which harmonic being illustrated in FIG. 2. This figure shows an amplitude-modulated signal, of which the frequency $f_w$, being also the transmitting frequency, is given by the relationship: $f_w = \frac{1}{2} f_p$. The amplitude of this signal depends on the pulse width of the pulsed signal in relation therewith and can be calculated by the Fourier method of analysis. For a desired amplitude behaviour of the abovementioned signal component it is thus possible to calculate the appurtenant pulse widths of the sequence of pulsed signals to be generated.

An arrangement which stores information on calculated values of pulse width and generates a sequence of pulsed signals to obtain an amplitude-modulated, ultrasonic transmission pulse will now be described with reference to FIGS. 3 and 4A–G.

Figure 3:
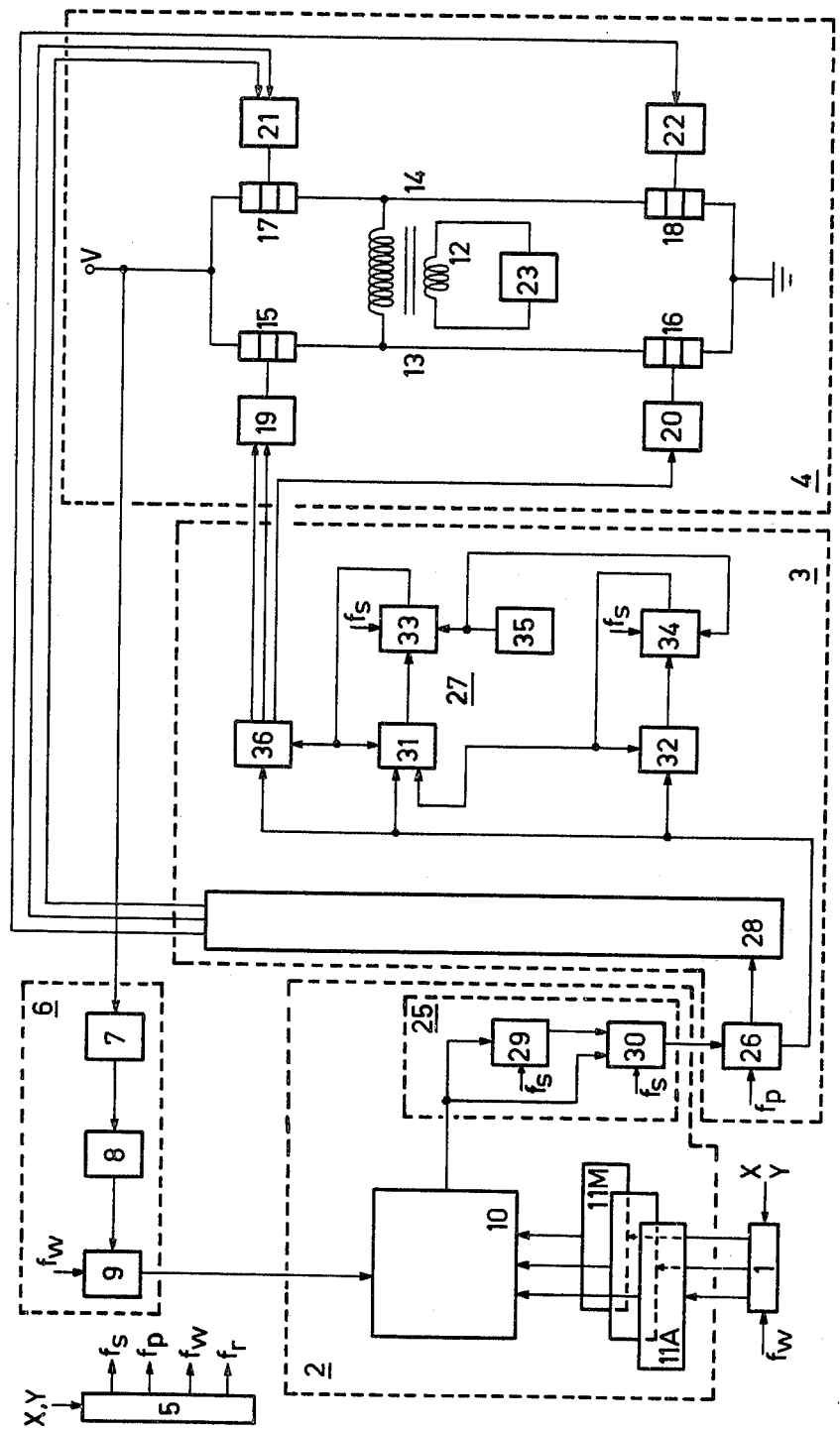
FIG. 3 is a block diagram of an arrangement for generating amplitude-modulated ultrasonic transmission pulses according to the invention.

FIG. 3 illustrates an address generator 1, a permanent memory 2, a switching-pulse generator 3, a switching circuit 4, and a unit 5 for generating timing signals with a wide application of digital techniques.

The address generator 1 produces addresses at frequency $f_w$. These addresses are used to assign information in memory 2 concerning the pulse width of the switching pulses to be generated in switching pulse generator 3. Since in the case in question high-power switching pulses must be generated in switching circuit 4 and, in view of space and economy, an accumulator of minimum size must be used, the supply voltage delivered by the accumulator will drop considerably during the generation process. This will occur to a greater extent as the width of the switching pulses to be generated is greater and, hence, the power from the accumulator is drawn over a longer period. If now an amplitude-modulated ultrasonic transmission pulse with a symmetrical waveform is desired and the series of pulse-width values to be produced in the first and second halves of the generation cycle are mirror images of each other, the decrease in the supply voltage, especially during the second half of the generation cycle of the switching pulse will cause an asymmetric amplitude behaviour of the transmission pulse. To prevent that the amplitude behaviour of the symmetrically generated transmission pulse be affected by the drop in the supply voltage, the pulse width values required in the second half of the transmission pulse generation cycle must be somewhat greater than those arranged in a mirror-image relationship in the first half of the cycle. It is therefore of great advantage to provide the arrangement for generating amplitude-modulated, ultrasonic transmission pulses with a pulse-width error generator 6, which is connected to the supply voltage V of the switching circuit 4 and which delivers the information to be gathered about the variation of this voltage to the permanent memory 2. This information combined with that of address generator 1 gives an insight into the pulse width information to be selected to obtain a transmission pulse with a symmetrical waveform from switching circuit 4. A feasible embodiment of pulse-width error generator 6 comprises a voltage sensor 7 connected to the supply voltage V, an A/D converter 8 connected to sensor 7, and a register 9 connected to A/D converter 8. Each time interval, in which two consecutive switching pulses are produced at a frequency $f_w$, the information obtained with A/D converter 8 is written into register 9 for subsequent-storage into memory 2.

Figure 1B:
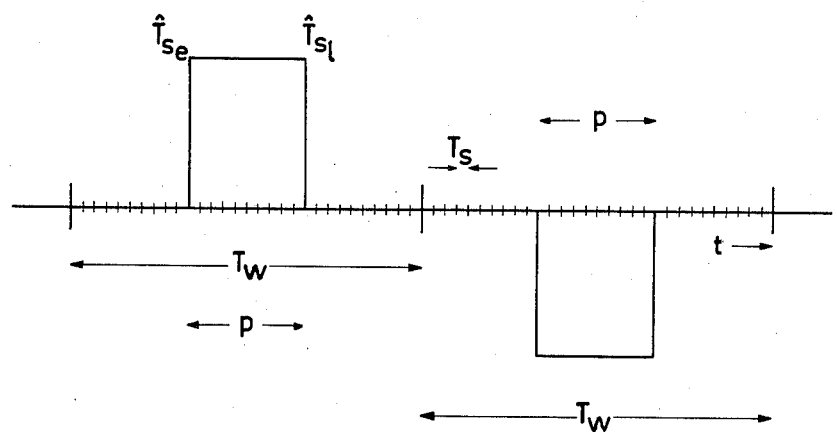
FIG. 1B is a fragment of the timing diagram of FIG. 1A.

Further, with the arrangement of FIG. 3 a choice can be made from several (m) transmitting frequencies $f_w$, using the frequency selection information Y applied to address generator 1. For this purpose unit 5 is designed to generate timing signals pertaining to frequencies $f_p$ and $f_w$. Memory 2 thereto comprises a main memory 10 and an assembly of submemories 11A–M corresponding with the number of transmitting frequencies $f_w$. Address generator 1 selects the desired submemory in accordance with the nature of the frequency selection information Y. On the supply of addresses from address generator 1, the submemory selected delivers the standard pulse width information pertaining to these addresses to the main memory 10. The supply of both the standard pulse width information and the aforementioned voltage amplitude information to main memory 10 results in the delivery of corrected pulse width, information concerning the transmission pulse from memory 10 to the switching pulse generator 3. Since the transmission pulse is generated in accordance with the corrected digital pulse width information and with the aid of counting circuits incorporated in switching pulse generator 3, the period $T_w$ pertaining to transmitting frequency $f_w$ is divided into a suitable number of time increments $T_s$ (see FIG. 1B); the clock pulses $T_s$ (to be generated at frequency $f_s$) corresponding with the time increments are supplied by unit 5. The corrected pulse width information from memory 2 is therefore relative to time increments $T_{se}$, in which the switching pulse will commence, and to time increments $T_{s1}$ in which this pulse will terminate.

Figure 2:
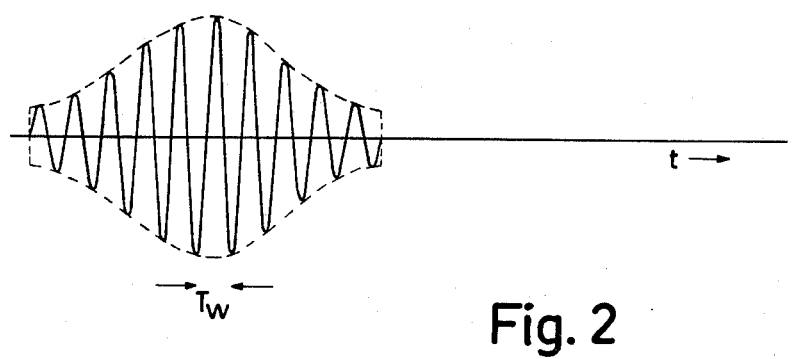
FIG. 2 is a timing diagram of an ultrasonic transmission pulse, whose amplitude is governed by the pulsed signals shown in FIG. 1A.

Using a sequence of suitably selected switching pulses generated following this principle, switching circuit 4 is activated with each switching pulse to derive the transmission signal of FIG. 2 from the inductive load 12 in the switching circuit. For this purpose the switching circuit 4 in FIG. 3 is provided with two parallel circuits 13 and 14 connected to the supply voltage V, each of which circuits consisting of a pair of series-connected power transistors 15, 16 and 17, 18 respectively. Each of these power transistors is driven by a base control element 19, 20, 21 and 22 respectively, receiving the required control signals from the switching pulse generator 3. Further, the center parts of circuits 13 and 14 are bridged by inductive load 12, which comprises a filter circuit 23 with an ultrasonic transducer at the secondary side. Two transistors 15 and 18 or 17 and 16, located in different circuits 13 and 14, and active at different voltage levels, must in turn be brought into the conducting state by means of switching pulses, whereas the other two transistors 17, 16 and 15, 18 must be cut off. In this way a voltage as shown in FIG. 1A is set up across the inductive load 12 of switching circuit 4.

Such switching of the power transistors 15–18 however requires that a power transistor 16 or 18 operating at the lower voltage level is cut off at least during the period in which power transistor 15 or 17 operating at the higher voltage level and in the same parallel circuit, is conducting to prevent a short circuit occurring in switching circuit 4. However, it is difficult to realise a switching program in which a transistor 15 or 17 operating at the higher voltage level is switched to the conducting state and the adjacent transistor 16 or 18 operating at the lower voltage level to the cut-off state at the same time, because the switching of transistor 16 or 18 to the cut-off state is slower than the switching of transistor 16 or 18 to the conducting state. Hence, to switch a power transistor 15 or 17 operating at the higher voltage level to the conducting state, transistor 16 or 17 operating at the lower voltage level should already be in the cut-off state. Further, when power transistor 15 or 17 operating at the higher voltage level is cut off, an induction voltage will be built up across the primary winding. If no measures are taken, this voltage will cause damage to transistor 16 or 18 connected to transistor 15 or 17 to be cut off. To prevent a negative induction voltage across the cut-off transistor 16 or 18, two measures have to be taken: the first measure consists in maintaining the cut-off state of transistor 16 or 18, operating at the lower voltage level, for some time after the adjacent transistor 15 or 17 operating at the higher voltage level has been cut off; the second measure consists in inserting a diode, normally in the cut-off state, parallel to transistor 16 or 18, operating at the lower voltage level and connected to transistor 15 or 17 to be cut off. With the use of pulsed switching signals, having a pulse width that approaches half of the period, such a diode will also bridge transistor 15 or 17 operating at the higher voltage level.

The switching of two interconnected transistors 15 and 16 or 17 and 18 therefore implies that the switching period in which transistor 16 or 18, operating at the lower voltage level, must be in the cut-off state, commences earlier but finishes later than the switching period in which the adjacent transistor 15 or 17 must be in the conducting state. To obtain suitable switching signals for this purpose the memory 2 also comprises a reference pulse circuit 25 connected to the main memory 10, while the switching pulse generator 3 is provided with a switch 26 connected to circuit 25 and a first and a second pulse shaping network 27 and 28 connected to switch 26. As already stated, the main memory 10 supplies the digital standard pulse width information. With this information the reference pulse circuit 25 generates a "reference" pulse $I_r$, situated symmetrical within the pertaining time interval determined by two timing signals $T_w$. A feasible embodiment of such a reference pulse circuit 25 is obtained with a subtracting unit 29, which stores the half value of the standard pulse width information at the start of the above time interval, and with an adding unit 30, which stores the full value of the standard pulse width information. The period of operation of adding unit 30 follows that of subtracting unit 29. Both units 29 and 30 are driven by increment pulses $T_s$ from the timing unit 5. Switch 26 controlled with the timing signals $T_w$ is used to activate the first and the second pulse shaping networks 27 and 28 alternately, such that in one time interval the control signals to be generated are received and processed by power transistors 15 and 16 and in the following time interval by the other two power transistors 17 and 18. Since the two networks 27 and 28 are similar, only the first pulse shaping network 27 will be described, making reference to FIGS. 4A–G.

Figure 4A:
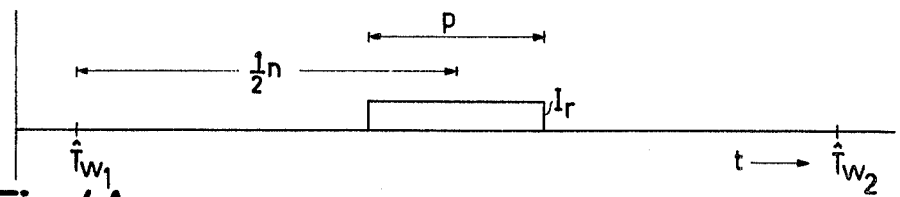
FIGS. 4A–G are a number of timing diagrams for illustrating the active state of various units forming part of the switching-pulse generator to obtain switching pulses for the switching circuit.

FIG. 4A illustrates a timing diagram of a reference pulse $I_r$ with a pulse width p specified in the standard pulse width information, as generated by the reference pulse generator 15 within the time intervals determined by the timing signals $T_{w1}$ and $T_{w2}$. The reference pulse $I_r$ is used to obtain a control pulse for the power transistor 15, operating at the higher voltage level, and a control pulse for the adjacent power transistor 16, operating at the lower voltage level, where the latter control pulse is initiated a certain period $\tau$ earlier, and may continue for a corresponding period $\tau$ longer than the former control pulse. To obtain such control pulses, the first network 27 comprises a first starting element 31, a second starting element 32, a first counter 33, a second counter 34, a register 35 and a logic circuit 36.

Figure 4B:
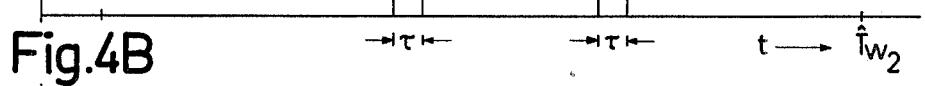
Figure 4C:
Figure 4D:
Figure 4E:
Figure 4F:
Figure 4G:
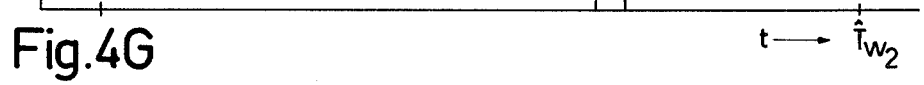

On receiving the leading edge of reference pulse $I_r$ (see FIG. 4A), the first starting element 31 will deliver a starting signal to the first counter 33, in which a given digital number representing a certain period $\tau$ from register 35 is stored (see FIG. 4B). This leading edge is also determinative for the start of the generation of the control signal for the other transistor 16 (see FIG. 4D). As soon as counter 33 has decreased to zero, this counter stops and delivers a switching signal to the logic circuit 36 (see FIG. 4E). This moment is determinative for the leading edge of the control pulse of FIG. 4E, which activates transistor 15. On receiving the trailing edge of the same reference pulse (see FIG. 4A), the second starting element 32 will deliver a start signal to the second counter 34 (see FIG. 4C), which also stored the number representing the period $\tau$ from register 35. At the instant counter 34 has decreased to zero, this counter stops and delivers a switching signal to the first starting element 31 (see FIG. 4B). Starting element 31 reactivates counter 33, in which again the number representing the time interval $\tau$ from register 35 is stored. The instant at which the first counter 33 is activated for the second time is also the instant at which the control signal for transistor 15, operating at the higher voltage level, is to be terminated (see FIG. 4E). The moment when the first counter 33 has again decreased to zero is determinative for terminating the generation of the control signal for the other transistor 16 (see FIG. 4D). To obtain the active state of power transistor 15 according to FIG. 4E, the logic circuit 36 comprises two separate outputs connected to the base control element 19, which consists of an inductive transmission circuit (not shown in the figure) with a double primary winding, energised separately by the signals generated at the separate outputs of the logic circuit 36. On the leading edge of the signal generated at one output the power transistor 15 will start conducting through one of the primary circuits, and on the leading edge of the signal generated at the other output this transistor will be cut off through the other primary circuit. The arrangement described above enables to generate an ultrasonic transmission signal having an accurately defined amplitude modulation pattern. Such an arrangement is ideally suited to generate an ultrasonic transmission pulse with a negligibly low side-lobe level, using pre-established standard pulse width information, which is later adaptable with the pulse-width error generator 6; this creates better possibilities to determine a doppler frequency in an echo signal from an object moving in water. For an example of a transmission pulse of such characteristics, reference is made to a pulse with an amplitude behaviour characterised by the socalled Hamming function:

$$f(t) = A[1 + B \sin^2(ct + d)]$$

where A, B, c and d are suitably selected constants.

Figure 5:
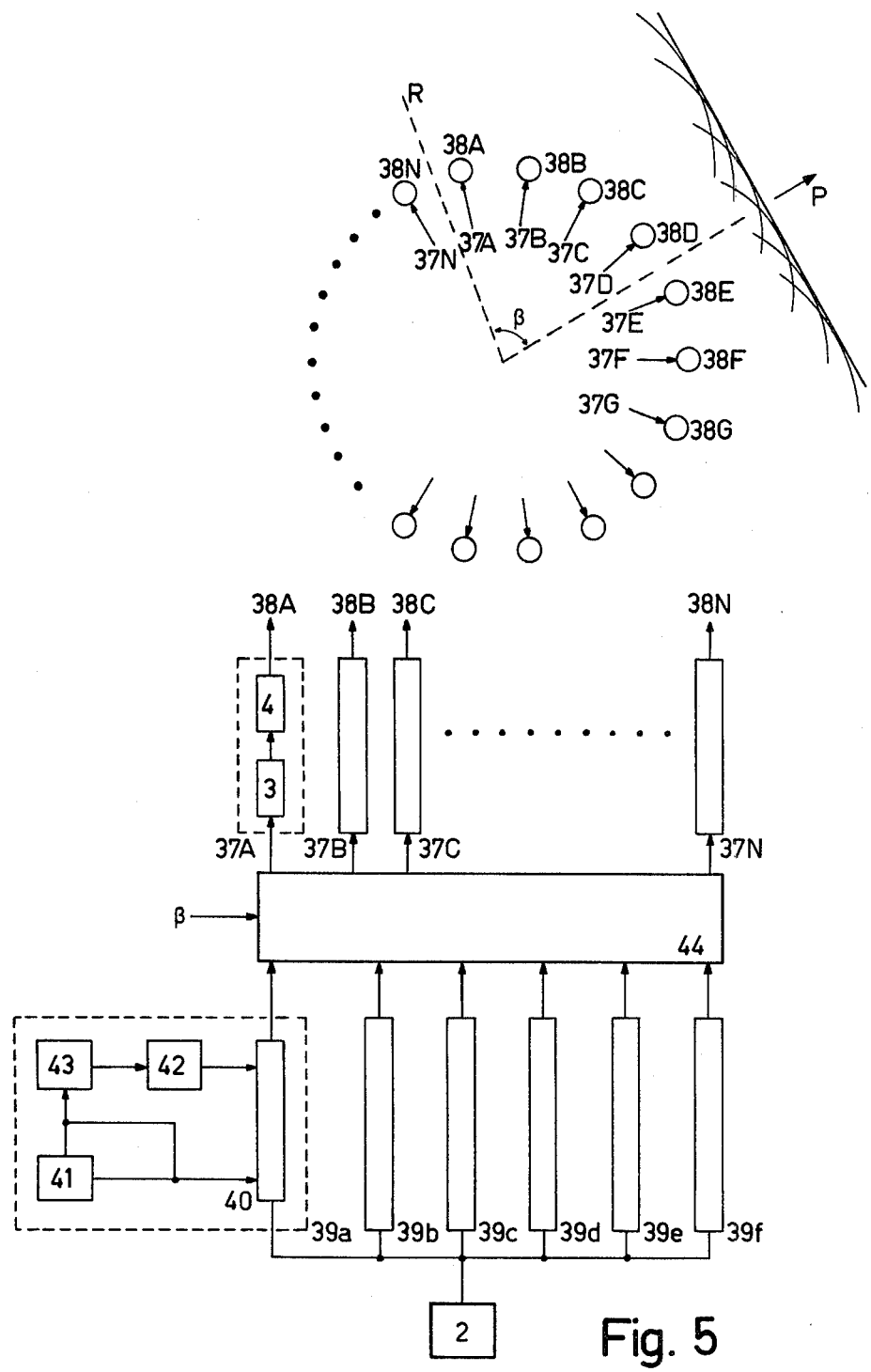
FIG. 5 is a block diagram of a combination of arrangements for generating amplitude-modulated ultrasonic transmission pulses according to the invention to obtain a transmission pulse having a defined wavefront.

Furthermore, the above described method of generation of ultrasonic transmission pulses offers a suitable possibility to generate such pulses with a directed plane wavefront in accordance with the principle of interference. This will be explained with reference to FIG. 5.

The arrangement shown in this figure comprises a number of power amplifiers 37A–N, to which a corresponding number of transducers 38A–N are connected separately; these transducers are arranged in a circle. Each of the power amplifiers 37A–N consists of a switching pulse generator 3 and a switching circuit 4, as described with reference to FIG. 3.

This arrangement further comprises a memory 2 of which the operation has already been described with reference to FIG. 3.

To transmit a plane wavefront in a desired direction, it is not necessary to activate all transducers; it is sufficient to use a limited number of transducers which are oriented substantially in the direction of propagation of the plane wave. This will be illustrated below in an example in which the number of transducers is limited to six. To generate a plane wave at an angle $\beta$ with respect to a fixed reference line R (see FIG. 5), the six transducers 38B–G are oriented in a direction which corresponds nearest with the direction of propagation of the plane wavefront. Transducers 38B–G have an identical program for the generation of switching pulses, as described with reference to FIGS. 1A–B, 2 and 4A–G, but these six switching programs are not completed in phase. Only the switching programs for transducers 38B and 38G are carried out simultaneously, like the switching programs for transducers 38C and 38F and those for transducers 38D and 38E. On the other hand, the switching program for transducers 38C and 38F are delayed with respect to that for transducers 38B and 38G, while the switching program for 38D and 38E is again delayed with respect to that for transducers 38C and 38F. The delay times between the various programs should be selected and carried out accurately, as this will be to the benefit of the quality of the plane wave. The required delays can be obtained with the aid of digital delay lines 38a–f. These delay lines contain the word concerning the reference pulse for the period $T_w$ (see FIG. 1B). Therefore, a first number of memory cells of the delay line will be filled for example with the binary number 0, then with the binary number 1 for a period corresponding with the pulse width p, and again with the binary number 0 for the remaining period $T_w$. Since delay lines 39a–f are identical to each other, only delay line 39a will be described.

Delay line 39a comprises a shift register 40, of which the word length is determined by the number of time increments $T_s$ during a period $T_w$. Shift register 40 contains the reference pulse in binary form. Delay line 39a further comprises a write pulse generator 41, a register 43 and a read pulse generator 42. The write pulse generator 41 generates a write pulse, which ensures that, on the application to shift register 40, the binary reference pulse required for a following period $T_w$ is transferred from memory 2 into the shift register 40. This write pulse is also applied to register 43, which in response delivers to the read pulse generator 42 a digital number representing the required delay. After count-down of this digital number in generator 42, this generator delivers a read pulse to the shift register 40 to shift the binary information on the pulse shape out of shift register 40. To get the information of the six delay lines 39a-f into the appropriate six power amplifiers, 37B-G in the case in question, a selection circuit 44 is incorporated between the six delay lines 39a-f and the power amplifiers 37A-N. With the given angle β the selection circuit 44 connects the six power amplifiers 37B-G, separately to delay lines 39a-f to transmit the plane wavefront at an angle β with respect to the reference line R.

I claim:

1. Arrangement for generating amplitude-modulated, ultrasonic transmission pulses, characterised in that said arrangement comprises a combination of:
   a. a switching circuit controlled with a plurality of switching pulses per pulse interval, which switching circuit includes an inductive load circuit for generating the transmission pulses;
   b. a unit for generating timing signals determining the switching pulse frequency;
   c. a memory, of which the memory locations are filled with the information, required per transmission pulse interval, about the pulse width of the switching pulses to be generated, which information is derived from the desired amplitude pattern of the transmission pulses to be generated;
   d. a switching-pulse generator for producing the switching pulses, using the timing signals on the one hand and the pulse width information in the memory on the other hand;
   e. an address generator for generating addresses on the supply of the timing signals to read out the memory.

2. Arrangement for generating amplitude-modulated, ultrasonic transmission pulses as claimed in claim 1, characterised in that the memory comprises a number of submemories corresponding with the number of transmitting frequencies, where the memory locations of each of the submemories are filled with pulse width information of the switching pulse which pulse width information is matched to a fixed transmission pulse amplitude, and that the addresses to be produced by the address generator comprise information concerning the submemory relative to the selected transmitting frequency.

3. Arrangement for generating amplitude-modulated, ultrasonic transmission pulses as claimed in claim 1, characterised in that the arrangement further comprises a voltage sensor for obtaining information about the supply voltage of the switching circuit, which supply voltage determines the pulse amplitude, and that the memory is further provided with a main memory for generating the pulse width information for the switching-pulse generator upon the supply of both the information from the address generator and said information about the supply voltage which determines the pulse amplitude.

4. Arrangement for generating amplitude-modulated, ultrasonic transmission pulses as claimed in claim 1, where the switching circuit comprises a bridge circuit consisting of four power transistors and incorporating the inductive load, whereby the two pairs of transistors arranged diametrically in the bridge circuit are alternately brought into the conducting state and the cut-off state under control of the switching pulse generator, characterised in that the switching pulse generator brings the desired power transistor operating at the higher voltage level in the conducting state for a first period, corresponding with the desired pulse width, and the adjoining power transistor operating at the lower voltage level in the cut-off state for a second period including said first period.

5. Arrangement for generating amplitude-modulated, ultrasonic transmission pulses as claimed in claim 4, characterised in that for each pair of power transistors at the same side of the inductive load the switching pulse generator comprises a separate pulse shaping network to generate alternately switching pulses for bringing the power transistor operating at the higher voltage level into the conducting state and for bringing the other power transistor operating at the lower voltage level into the cut-off state.

6. Arrangement for generating amplitude-modulated, ultrasonic transmission pulses as claimed in claim 5, characterised in that:
   a. the switching pulse generator comprises a reference pulse circuit for generating reference pulses of the desired pulse width upon the application of the pulse width information supplied by the memory;
   b. the pulse shaping network is designed to generate first-, second- and third-order switching pulses upon the application of reference pulses, whereby the leading edge of the first- and the second-order switching pulses are delayed over a given period τ with respect to respectively the leading and the trailing edges of the reference pulses, and whereby the third-order switching pulses commence at the instants determined by the leading edge of the reference pulses and terminate on the expiration of a period 2τ following the instants determined by the trailing edge of the reference pulses; and
   c. for each pair of power transistors at the same side of the inductive load the switching circuit comprises a first and a second base control circuit to keep, upon the application of the first- and the second-order switching pulses, the power transistor operating at the higher voltage level, in the conducting state during an interval determined by the leading edges of each pair of consecutive first- and second-order switching pulses and to keep upon the application of the third-order switching pulses, the power transistor, operating at the lower voltage level, in the cut-off state.

7. Arrangement for generating amplitude-modulated, ultrasonic transmission pulses as claimed in claim 6, characterised in that the first base control circuit comprises at least an inductive voltage transmission circuit containing a dual primary winding for a separate supply of the first- and the second-order switching pulses.

8. Arrangement for generating amplitude-modulated, ultrasonic transmission pulses as claimed in claim 6, characterised in that a memory location is filled with a digital number representing the value n-x, where n is the number of clock pulse intervals corresponding with one switching pulse period and x the specific pulse width expressed in the number of clock pulse intervals, and that the reference pulse circuit is provided with a subtracting unit which unit being reactivated at the start of each switching pulse period receives the half value of said digital number stored in said memory location, and with an adding unit to be activated by the subtracting unit at the instant the latter unit reaches its zero position, which adding unit counts to the number n and receives said digital number as starting position, whereby the reference pulse is produced during the active period of the adding unit.

9. Arrangement for generating amplitude-modulated, ultrasonic transmission pulses as claimed in claim 5, characterised in that the first and the second pulse shaping networks alternately receive identical pulse width information from the memory.

10. Arrangement for generating amplitude-modulated, ultrasonic transmission pulses as claimed in claim 6, characterised in that a pulse shaping network comprises a combination of:

a. a first counting unit with an active period $\tau$, which counting unit is to be triggered on the trailing edge of the reference pulse;

b. a second counting unit to be triggered on the leading edge of the reference pulse and on the stop signal of the first counting unit; and c. a logic circuit which produces the first-, second- and third-order switching pulses upon the application of the reference pulses and the start and stop signals of the second counting unit.

11. Arrangement for generating amplitude-modulated, ultrasonic transmission pulses as claimed in claim 1, characterised in that the arrangement comprises a plurality of units consisting of a switching pulse generator and a switching circuit, which units are connected to the memory by means of separate delay lines.

* * * * *